United States Patent [19]

Chung

[11] 4,357,634

[45] Nov. 2, 1982

[54] ENCODING AND DECODING DIGITAL INFORMATION UTILIZING TIME INTERVALS BETWEEN PULSES

[76] Inventor: David H. Chung, 4046 Ben Lomond Dr., Palo Alto, Calif. 94306

[21] Appl. No.: 107,048

[22] Filed: Dec. 26, 1979

Related U.S. Application Data

[63] Continuation-in-part of Ser. No. 80,415, Oct. 1, 1979.

[51] Int. Cl.$^3$ ............................................. G11B 5/09
[52] U.S. Cl. ....................................... 360/40; 375/23
[58] Field of Search ...................... 360/40, 44; 375/23; 370/10

[56] References Cited

U.S. PATENT DOCUMENTS

| | | | |
|---|---|---|---|
| 3,162,857 | 12/1964 | Sanders | 375/23 |
| 3,209,259 | 9/1965 | Huber | 375/23 |
| 3,281,806 | 10/1966 | Lawrance et al. | 360/44 |
| 3,304,542 | 2/1967 | Sutton et al. | 360/44 |
| 4,032,979 | 6/1977 | Rice | 360/40 |

*Primary Examiner*—Vincent P. Canney
*Attorney, Agent, or Firm*—Thomas E. Schatzel

[57] ABSTRACT

A method and apparatus for encoding and decoding digital information upon a recording medium using the time interval between adjacent pairs of pulses. A number "n" of unique time intervals between pulse pairs correspond to "n" unique symbols contained within a coding table. Assignment of the durations between pulses adapted to the frequency of occurrence of particular symbols within a data stream materially increases the efficiency of the method. Division of the data stream and numerical transformation of the data stream improve the efficiency of adaptive assignment of the durations between pulses on the basis of frequency of occurrence of particular symbols within a data stream. The method realizes a multiple-fold increase in data storage capacity of rotating magnetic disk memories over common MFM encoding, and the method similarly realizes a multiple-fold increase in data transfer rate for telecommunications applications.

31 Claims, 6 Drawing Figures

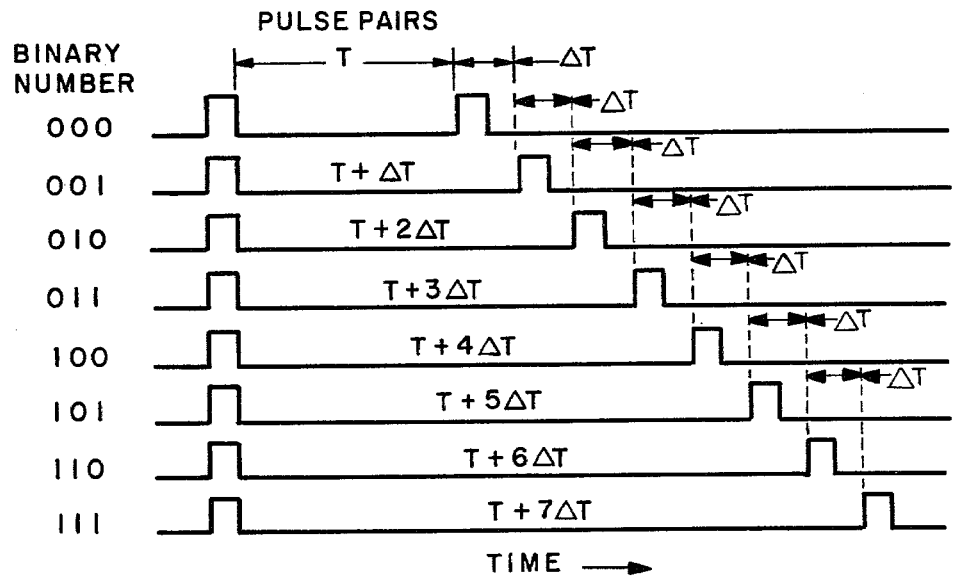
Fig_1
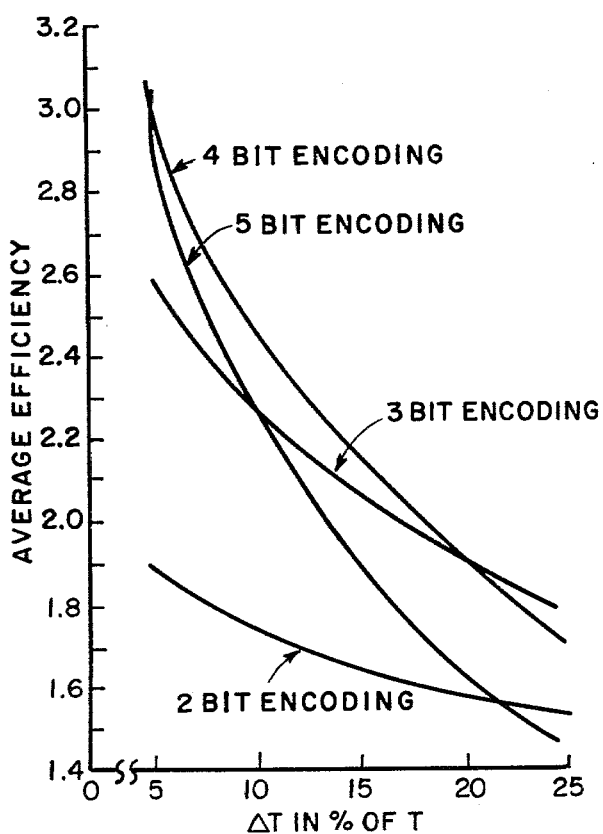
Fig_2
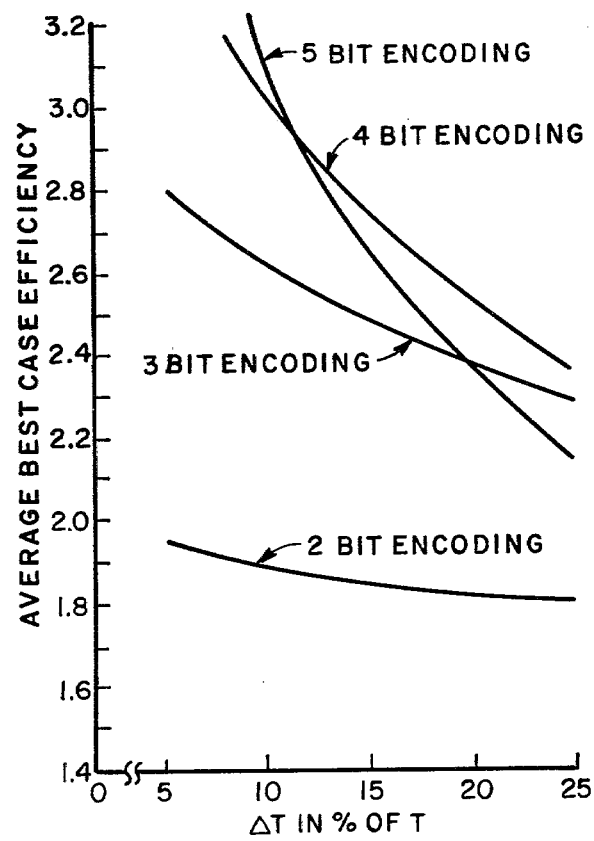
Fig_3

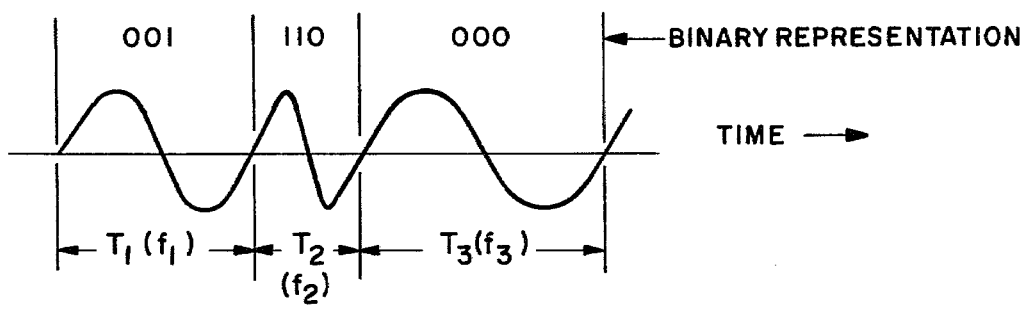
Fig_4
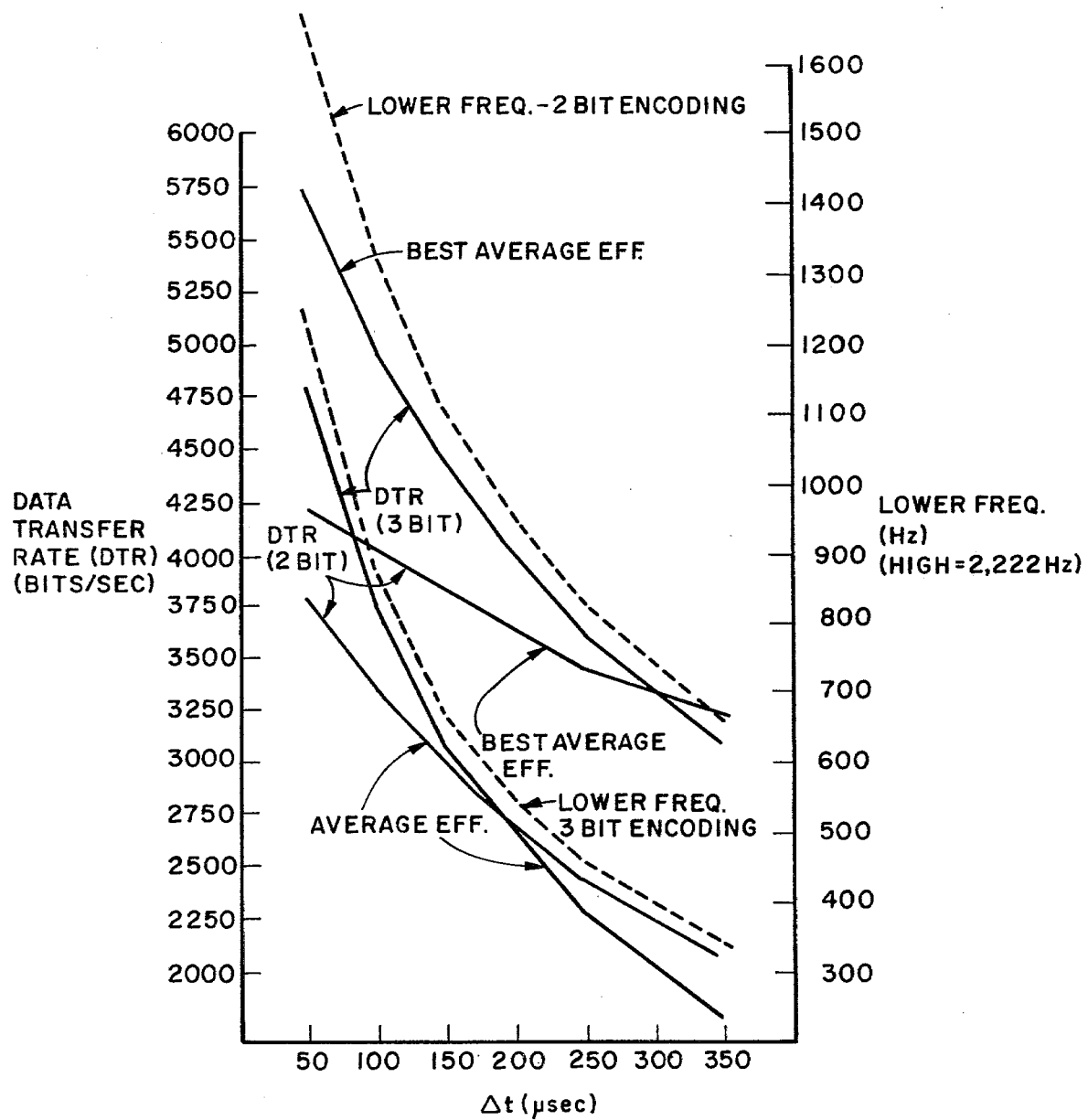
Fig_5

ENCODING AND DECODING DIGITAL INFORMATION UTILIZING TIME INTERVALS BETWEEN PULSES

This application is a continuation-in-part of Ser. No. 080,415, filed Oct. 1, 1979.

BACKGROUND OF THE INVENTION

1. Field of the Invention

The field of the invention relates to digital encoding and decoding of information on a recording medium. The invention finds particular application in digital magnetic recording in order to optimize the information stored upon the magnetic media and in telecommunications transmissions in order to increase the effective data transfer rate of the information.

2. Description of the Prior Art

Various techniques for coding digital information have been developed since the inception of magnetic media to accommodate storage and retrieval of information in conformance with a pattern of flux reversals impressed upon recording media. While all digital encoding and decoding schemes have as their primary goal the storage of information upon the magnetic media, there are advantages to employing certain schemes over others based upon the efficiency of information storage. That is, some digital encoding schemes permit greater quantities of information to be stored than other schemes when normalized to a certain predetermined number of flux reversals.

For example, digital data may be encoded using the so-called frequency modulation or FM scheme. In the well known FM-encoding scheme, clock pulses are interspersed with data pulses. A clock pulse is written at the beginning of each bit cell and data pulses are either written (data "1") or not written (data "0") in the middle of a particular bit cell depending upon the information to be stored. Decoding is naturally the reverse of encoding. FM encoding is relatively inefficient with respect to the amount of media consumed to store a given amount of information. A method for clocking is required to implement FM-encoding as flux transitions must appear at fixed intervals, and the packing density of bits (i.e., flux transitions) is extremely high relative to the information stored.

As a second example, modified frequency modulation or MFM is well known in the art and enhances the efficiency of digital information storage compared with single density or FM encoding. In MFM encoding, data bits are either written (data "1") or not written (data "0") in the middle of a bit cell depending upon the information to be stored, and clock pulses are only written at the beginning of a bit cell if no data bit has been written in the previous bit cell and no data bit will be written in the present bit cell. By use of MFM, the packing density of flux reversals is significantly reduced for an equivalent amount of stored information relative to FM, because clock pulses are seldom written. However, for both FM and MFM, a phase locked oscillator (PLO) has been employed to separate clock pulses from data pulses within a pulse stream with the phase locked oscillator synchronized to some timing reference standard. Both FM and MFM are limited in the amount of data that can theoretically be stored within a given number of flux reversals. Also, both FM and MFM in prior art systems require the constant input from a phase locked oscillator for comparing to the data stream in order to decode clock pulses from data pulses (and conversely, the PLO is required in order to write the correct stream of clock pulses and data pulses in the data writing operation). That is, both FM and MFM-encoding schemes utilize the concept of a fixed duration "bit cell" whether an actual flux reversal or bit occurs within the bit cell or not.

Another digital encoding/decoding scheme is known in the art as "3PM." The 3PM code establishes a fixed interval which is thereafter divided into six subintervals. Under the rules of the code, two flux reversals are written within each grouping of six subintervals, but pulses may not be written closer than three subintervals apart. A single interval of six subintervals suffices under the code to store three bits. The 3PM code effectively increases the efficiency of data storage compared to MFM encoding by approximately 1.5 times. However, the 3PM code also requires a phase locked oscillator, because the placement of flux reversals upon the media must occur within predetermined intervals or windows.

Moreover, in FM, MFM or even the more modern 3PM digital encoding/decoding schemes, a fixed time interval is always required to store each bit of data. In FM and MFM encoding, three bit cells are required to store three bits. In the 3PM code, one major bit cell divided into six subintervals is required to store three bits. In any case, no more than three bits, in this example, may be stored in less than three bit cells for FM or MFM and one major interval for 3PM irrespective of the data being encoded.

The prior art in magnetic recording, coding and encoding, is characterized by the general concept of run length limited codes of which FM, MFM, and 3PM are particular types. Run length limited codes, in general, always require a clock, bit cell durations have an absolute minimum, and bit cell durations have an absolute maximum. Such run length limited codes have limited efficiency as measured by the number of flux reversals required to store a certain data stream and the efficiency of the code is basically independent of the data stream. In practice, the establishment of bit cells has required the universal use of phase locked oscillators in high density applications.

In the area of telecommunications, the technology can be generally divided into two categories: asynchronous communications and synchronous communications. Both asynchronous and synchronous communications are bit serial techniques, but synchronous communications are of relatively high speed. Typical high speed synchronous protocols are defined by the well-known BISYNC and SDLC standards. Asynchronous communications, on the other hand, are of relatively low speed. A typical application of low frequency asynchronous communication is a Western Electric 202 modem which attaches to a standard telephone line. The maximum data rate achievable is 1200 baud, or 1200 bits/second. Unconditioned telephone lines demand a bandwidth limitation of 2400 Hz due to the characteristics of the transmission medium.

As with magnetic media, synchronous telecommunications, and even asynchronous telecommunications, an increase in data storage efficiency or data transmission efficiency without exceeding the physical constraints of the storage and/or transmission medium is an ever-present goal. Although economically of tremendous importance, significant increases in data storage efficiency over MFM in magnetic recording media or significant increases in the data transfer rate over 1200 baud using an unconditioned telephone line have not been available.

SUMMARY OF THE PRESENT INVENTION

It is thus an object of the present invention to provide a digital encoding/decoding scheme that significantly increases the efficiency of digital data storage and retrieval as measured by the media required to store a certain quantity of information.

It is another object of the present invention to significantly increase the quantity of data which may be stored upon magnetic media.

It is yet another object of the present invention to provide a digital encoding/decoding scheme which does not require a phase locked oscillator to encode and decode digital data.

It is another object of the present invention to provide a method and apparatus to significantly increase the data transfer rate in telecommunications.

It is another object of the present invention to provide a method and apparatus that significantly increases the asynchronous data transfer rate of telecommunications information over an unconditioned telephone line.

In one embodiment of the present invention applicable to magnetic recording, interval timers are utilized to establish a time interval between a pair of flux reversals, i.e. pulses. In the encoding/decoding scheme of this invention, the duration between flux reversal pairs corresponds to a particular encoded symbol (e.g., binary number). Depending upon the magnetic recording technology to which all digital encoding/decoding schemes are applied, there exists a minimum time interval in which a pair of flux reversals, pulses, may be recorded and reproduced. This minimum time interval is employed in the digital encoding/decoding scheme of this invention to encode a single, unique symbol. In addition to this minimum time interval, however, pairs of flux reversals, pulses, which are separated by time intervals longer than the minimum time interval may be recorded and reproduced. Thus, in the encoding/decoding scheme of this invention, resolvable, incremental time intervals of a duration shorter than the minimal time interval for recording and reproducing a pair of flux reversals, pulses, are added to that minimum time interval to establish longer time intervals between flux reversal pairs. The longer durations between flux reversals, pulses, thus established are respectively used for encoding symbols other than the one represented by the minimum time interval. Since each symbol in this encoding/decoding scheme is represented by a corresponding time interval between flux reversal pairs, pulses, no flux reversals other than those needed to establish the respective symbol encoding duration are required to express the encoded symbols. Thus, it is seen that a set of symbols, e.g. binary numbers, encoded in this manner are not constrained to fixed time interval bit cells as with the prior art run length limited codes, but are rather each respectively encoded into unique time intervals corresponding to each unique symbol. To take an example of encoding symbols consisting of three binary digits with the scheme of the present invention, a given pair of flux reversals separated by a minimum interval T could correspond to binary number "000". That minimum time intervals plus an incremental time interval, $(T+\Delta)$ might correspond to the binary number "001." $(T+2\Delta T)$ could correspond to the binary number "010." This process is repeated for all eight distinct combinations until all eight unique time intervals respectively corresponding to the eight unique symbols are defined. By appropriate choice for the durations of T and $\Delta$, the efficiency of information stored within a series of flux reversal pairs by the present invention is significantly increased over, other encoding schemes such as MFM encoding.

The invention further includes the use of adaptive assignment for the encoding and decoding of the duration between flux reversal pairs so that particular symbols or numbers which appear frequently are assigned the shortest durations. That is, if a particular symbol occurs most frequently in a plurality of successive symbols making up a data stream, that symbol should be assigned the minimal time interval, T. Likewise, a symbol which occurs most infrequently should be assigned the longest time interval, e.g. $(T+7\Delta T)$ for a three bit code. If the frequency of occurrences of the symbols making up a data string are ranked (i.e., a histogram computed), and thereafter those symbols are assigned durations on the basis of minimizing the total time interval for the encoded data stream, the efficiency of the entire encoding/decoding scheme of the present invention is greatly enhanced.

As a further improvement to the efficiency of the present invention, a particular data stream may be divided by utilization of a number of techniques, among them the so-called "Hamming" code technique. That is, data may be randomly distributed vis-a-vis the frequency of occurrence of particular symbols over a data field. Adaptive assignment will not improve the efficiency of the present invention if the frequency with which symbols appears in a data stream is a uniformly distributed random function. However, such an equal random distribution of the frequency of data symbols may not be uniformly distributed over certain particular divisions or portions of the data stream. Therefore, by dividing the data stream up in a high speed fashion by appropriate routines within a digital computer an increase in the efficiency of the data encoding/decoding may be achieved. With both adaptive assignment and data transformation by use of a technique such as a "Hamming" code, information relating to the correspondence between particular time intervals and data symbols must be stored in a coding table coupled to the encoded information so it may be subsequently decoded.

A yet further improvement in the efficiency of the present invention, transformation of the data stream may be undertaken. That is, if a data stream exhibits no asymmetry in its histogram of number or symbol occurrences even after division of the data stream in half, into quarters, etc., appropriate routines can be invoked to first transform it into an assymetrically distributed data stream such as by adding a fixed number to its binary representation. By addition of a properly computed number to a portion of the data stream, an unsymmetrical histogram may be created thereby permitting adaptive assignment of numbers to reduce the overall duration of that encoded portion of the data stream. Naturally, the coding table coupled to the data stream encoded in conformance with the present invention must also contain information to reverse the transformation of the encoded data stream and said coding.

From the above discussion, it is clear that there are only two parameters that define the characteristic of a data stream: (1) the symbols (i.e., the numbers or letters), and (2) the position of said symbols in said data stream. Adaptive assignment capitalizes upon the statistical frequency of certain symbols within the data stream and assigns a correspondence between time intervals and symbols on the basis of frequency of the particular symbols. The relative frequency of occurrence of a symbol within a data stream may be altered by dividing said data stream in order to increase the asymmetry of the histogram of the frequency of occurrence of symbols within substreams of the data stream. Transformation of a data stream affects the relative frequency of occurrence of symbols in a data stream and therefore, potentially, the division of said data stream. Naturally, adaptive assignment, division of the data stream, and transformation information must all be contained in a coding table coupled to each encoded data stream in order to properly decode same. In the final analysis, it is the speed and availability of microprocessors that makes practical and economic the modifications to the data stream as suggested in the present invention beyond the basic interval timer concept. The powerful result is harnessing the ever decreasing cost and increasing speed of computation to materially improve digital data encoding and decoding efficiency.

While microprocessors can perform the computational requirements as discussed herein, it is clear that in certain applications the required computations can be performed in a hardware implementation. In fact, in certain applications requiring extreme speed and low cost, a hardware implementation may be the most cost-effective way to implement the encoding/decoding scheme of the present invention.

The only parameter in the data encoding/decoding method of the present invention is the timed interval between flux reversal pairs. Implementation does not require a phase locked oscillator for decoding, and the data encoding/decoding scheme of the present invention is independent of low frequency velocity variations of the media. It is thus possible by use of the encoding/decoding method of the present invention to provide a multiple-fold increase over commonly used MFM and other schemes of encoding/decoding disclosed in the prior art.

The method of the present invention is equally applicable to telecommunications. While synchronous telecommunications applications involving the use of digital pulses are clearly within the ambit of the present invention, an alternative embodiment exists for asynchronous communications over an unconditioned telephone line. The method of encoding symbols into time intervals as described above is utilized to generate a series of tones, or frequencies. Each frequency corresponds to a particular symbol. To decode this frequency encoding, a sinusoid of each tone or frequency is digitized into a pair of pulses. The measured time separation between these pulses is compared to a range of time intervals stored in a coding table. The assignments of symbols to pulse pairs contained in this coding table are transmitted at least once with each encoded data stream. Further, the techniques of adaptive assignment, division, and transformation of the data stream all apply equally well to telecommunications utilizing this encoding/decoding method. A suggested apparatus to accomplish the method of the present invention in the form of a modem for use on unconditioned telephone lines utilizes a transmitter, a receiver, and a coding/encoding algorithm processor to perform the operations of the present invention.

It is thus as advantage by use of the method of the present invention to achieve a multiple-fold increase of data storage efficiency over digital encoding/decoding schemes of the prior art.

It is another advantage of the present invention to obviate the need for a phase-locked oscillator to encode and decode digital data pulses.

It is a further advantage of the present invention to eliminate the need for a servo clocking input in rotating magnetic disk drives of the prior art.

It is yet another advantage of the present invention that detection of the beginning of a record is made substantially easier than in the prior art through use of a unique duration between a pair of adjacent flux reversals assigned to indicate such a beginning of record event.

It is yet another advantage of the present invention that the decreasing cost and increasing speed of computation may be utilized to maximize efficiency of the information which may be stored upon magnetic disk storage devices.

It is a further advantage of the present invention to provide an increased data transfer rate when applied to telecommunications without a degradation in error rate or reliability.

It is yet another advantage of the present invention to provide an increased data transfer rate for asynchronous communications over an unconditioned telephone line without exceeding the maximum bandwidth of such an unconditioned telephone line.

These and other advantages and objects will become clear to those skilled in the art by reference to the following description of the preferred embodiment and by reference to the drawing figures.

IN THE DRAWING

FIG. 1 is a time pulse representation of eight pulse pairs showing a three bit coding of the present invention;

FIG. 2 is a graphic representation illustrating the average efficiency of the present invention in comparison with MFM encoding for two, three, four, and five bit coding as a function at $\Delta T$; and FIG. 3 is a graphic representation illustrating the average best case efficiency of the present invention in comparison with MFM encoding for two, three, four, and five bit coding as a function of $\Delta T$;

FIG. 4 is a representation of several sinusoids as transmitted in the telecommunications embodiment of the present invention;

FIG. 5 is a graphic representation of data transfer rate as a function of the time increment between symbol representations illustrating the efficiency of the method of the present invention.

DESCRIPTION OF THE PREFERRED EMBODIMENT

Figure 6:
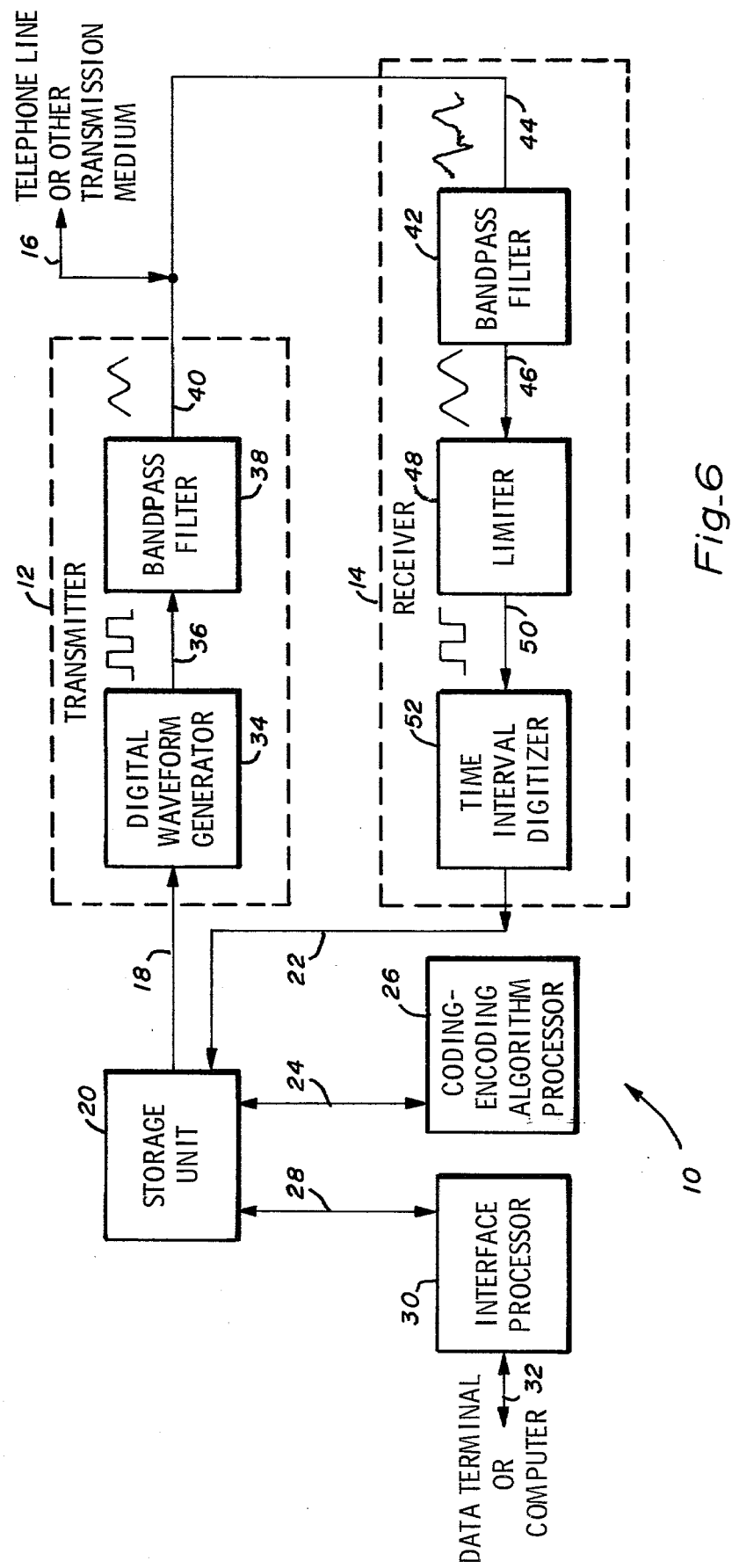
FIG. 6 is a hardware block diagram illustrating a modem according to the present invention.

In accordance with the present invention as applied to decoding magnetic recording, interval timers are utilized to measure the elapsed duration between a pair of flux reversals, i.e pulses. The duration between said pair of flux reversals is compared to time intervals stored within a coding table relating time intervals to a particular symbol, character, or binary digit pattern. In its most general concept, the present invention utilizes a duration "T" as the minimum duration between a pair of adjacent flux reversals for encoding a particular symbol. A plurality of incremental durations $\Delta T_j'$ are added to that minimum duration "T" to encode additional symbols. Thus, the duration between flux reversals, pulses, for each encoded symbol may be expressed as a summation of the form $$T + \sum_{j=0}^{k-1} \Delta Tj$$

In this representation for the respective time intervals the number "K" corresponds to the symbol to be encoded and cannot exceed the number of symbols in the set of "n" symbols being encoded. For example, such a set of "n" symbols could be established to represent all symbols expressable with three binary digits. There are $2^3$ or 8 distinct symbols, binary numbers possible utilizing three binary digits. Therefore, this example, K would be an integer between 1 and 8. Thus, eight different durations are established between adjacent flux reversals, i.e. pulses, each duration respectively related to one of the eight symbols in the set of "k" symbols being encoded by a time interval stored in the coding table.

By way of example, a three bit code implemented utilizing the present invention is shown in FIG. 1. The binary number "000" is represented by the basic minimum time interval T. The binary number "001" is assigned an interval of $(T+\Delta T)$. Likewise, the binary number "101" is assigned the interval $(T+5\Delta T)$, and so on. In this example, $\Delta T$ is equal for all intervals. Pulse pairs (a "pulse" as used herein is defined as any generic marker in time including a flux transition) as shown in FIG. 1 therefore can be related to a particular symbol if the time interval between those pulses is measured and then decoded by comparison with the ranges of the time intervals related to particular symbols by the coding table. Such a look-up or coding table would be stored in the header or preamble zone of a record storing an encoded data stream. The association of symbols for binary numbers with particular time intervals between the flux reversals in the coding table is known as "assignment."

The present method may be implemented so that, in theory, a binary number of any length can be made to correspond to a particular timed interval. However, practical limitations exist, and an object of the present method is to achieve increased data storage efficiency over the prior art. Thus, data storage efficiency of known methods is a lower bound. If the set of k symbols to be encoded by the present method contains too many symbols, i.e. the symbol's binary number representation contains too many digits, the present method will require an interval of extreme length to represent all possible symbols. For example, a ten digit binary number requires in the present method $2^{10}$ or 1,024 intervals. If practically resolvable values based upon current technology are chosen for T and $\Delta T$ are chosen, 1,024 intervals assigned between pairs of flux reversals makes the method inefficient. On the other hand, if the interval between adjacent flux reversals can be made diminishingly small, T and $\Delta T$ become correspondingly diminishingly small. Clearly, flux reversals can only be resolved within a certain degree of accuracy and media defects exacerbate the problem. Thus, depending upon the state of technology, there are practicable limitations for implementing the present invention.

It should be noted that FIG. 1 shows $\Delta T$ as a fixed proportion of T, and the incremental difference between any two adjacent interval times is $\Delta T$. However, the present invention is not so limited in theory. Windows or ranges of time intervals may be established for $\Delta T$ where $\Delta T$ is not a fixed proportion of T. It is only required that time intervals be unique, consecutive, and resolvable and that said time intervals be recorded in a coding table for decoding purposes. Thus, because the practical limitation on resolving the time intervals depends upon the current state of technology and because the time interval between pulses can be resolved only with a certain degree of accuracy, coding tables containing a range of time intervals, windows, related to the encoded symbols find their primary use in decoding whereas coding tables specifying a single time interval related to the encoded symbol are primarily used for encoding. Further, it is simple to assign $\Delta T$ as a fixed proportion of T, there may be non-linear effects in particular applications or other reasons urging variation in $\Delta T$ for respective symbol encodings.

As a general rule and for the purposes of measurement assuming equal and consecutive $\Delta T$'s, the average efficiency for implementing the present invention compared to an MFM encoding scheme is as follows:

$$\text{Average Efficiency} = \frac{\sum_{n=0}^{2^B-1} \frac{B}{1+nP}}{2^B}$$

where
B = number of bits in group
P = ratio of $\Delta T$ to T
n = running variable of the summation Referring to FIG. 2, a plot of the average efficiency in disk storage density as compared to MFM encoding versus $\Delta T$ as a percentage of T is shown for two bit, three bit, four bit, and five bit encoding of the present invention. It is clear that when $\Delta T$ as a percentage of T approaches 0, the average efficiency of disk storage density increases exponentially. However, diminishingly small differences in $\Delta T$ cannot be resolved in practical systems. Moreover, as $\Delta T$ gets exceedingly large, the average efficiency in disk storage density as compared to MFM encoding significantly degrades. The graph indicates that for practical ranges of $\Delta T$ as a percentage of T (10% to 20%) average efficiencies in disk storage density as compared to MFM encoding can achieve a factor of 2.47 (four bit encoding at 10%). As can be seen from FIG. 2, five bit encoding degrades extremely rapidly in its average efficiency in disk storage density as $\Delta T$ as a percentage of T increases, but, likewise, five bit encoding will experience a more rapid increase in average efficiency in disk storage density as $\Delta T$, as a percentage of T, approaches 0.

The most basic magnetic recording implementation of the present invention is described above. It is, however, within the conception of the invention that the efficiency of the present invention may be significantly enhanced by adapting the assignment of pulse interval pairs to particular symbols as a function of the frequency of occurrence of particular symbol in the data stream being encoded. For example, a processing unit connected to a disk storage device can be programmed to include an algorithm which will create a histogram of the symbols, binary numbers, making up a data stream or data field. If the most frequently occurring binary number is assigned the interval T in the coding table, i.e. the shortest time interval, the least frequently occurring binary number, is assigned the longest time interval in the coding table and each successively longer time interval stored in the coding table is assigned to the symbol having the next lower frequency of occurrence, then the basic encoding scheme of the present invention is significantly enhanced in efficiency as a function of said assignments. The assignments relating time intervals to symbols are said to be "adaptive" with respect to the data stream. Adapting the assignment to particular data streams so as to minimize the time intervals required to encode said data streams by the present invention has the potential for significantly increasing the efficiency of the present invention over the basic embodiment described above. Clearly, adaptive assignment based on a histogram of the frequency of occurrence of particular symbols will have no beneficial effect whatsoever if all symbols in the set of "n" symbols are uniformly distributed in the data stream.

On a statistical basis, it may be that particular symbols within a data stream occur with equal frequency over a given length of data. For example, take the data stream shown in Table I where the letters stand for informational symbols.

TABLE I
STATISTICALLY "UNIFORM" DATA STREAM

| Data Stream Symbol | aaaacbbbcaabccccbb Occurrence |
|---|---|
| a | 6 |
| b | 6 |
| c | 6 |

Over the data stream of eighteen characters, a's, b's, and c's occur with equal frequency and therefore, over the stream of eighteen symbols or characters, no statistical benefit would be achieved by adaptive assignment. However, if the data stream of the present example is divided in half into two data streams as shown in Table II, significant advantage can be realized through adaptive assignment.

TABLE II
DIVISION OF DATA STREAM

| Data Stream Symbol | aaaacbbbc Occurrence |
|---|---|
| a | 4 |
| b | 3 |
| c | 2 |

| Data Stream Symbol | aabccccbb Occurrence |
|---|---|
| a | 2 |
| b | 3 |
| c | 4 |

With the data stream divided in half as shown in Table II, the first grouping of characters has an occurrence of four a's, three b's and two c's, and the second grouping of characters has the occurrence of four c's, three b's and two a's. In this manner, adaptive assignment of the first group as a first record and adaptive assignment of the second group as a second record with appropriate look-up tables for each record will minimize the overall storage area of magnetic recording media required to store the information and correspondingly the time interval of the encoded data stream.

Division of the data stream can be accomplished in many ways in order to maximize the asymmetry of a histogram of the occurrence of symbols within substreams of a data stream. For example, a data stream may be divided into thirds, fourths, etc. A data stream may be divided by "Hamming" code techniques well known in the art. A data field stream may be divided by a coding table further specifying each substream of a data stream wherein coding table may be contained with the preamble to the data stream. In any event, it is likely that a data stream can be divided on a basis which maximizes histogram asymmetry with respect to symbol occurrences and hence reduces the time interval of the encoded data stream or, correspondingly, the area of magnetic recording media required for its storage.

As yet a further improvement to the basic concept of the method of the present invention relating to the use of interval timers to encode and decode information is the use of data transformation to alter the symbols comprising a data stream or substream. Data transformation may be performed by adding a number to the numerical representation of the data stream's symbols thereby changing their respective values. If the number so added is stored in the coding table, the original data stream may be recovered by subtracting said number from the transformed data stream at a later time. As an example of data transformation, Table III sets forth a data stream before and after transformation.

TABLE III
DATA TRANSFORMATION
(octal)

| | | | | | | | |
|---|---|---|---|---|---|---|---|
| Data Field | 7 | 5 | 6 | 3 | 4 | 0 | 1 | 2 |
| Transformation Number | −0 | 1 | 2 | 3 | 4 | 5 | 6 | 7 |
| Transformed Data Field | 7 | 4 | 4 | 0 | 0 | 3 | 3 | 3 |
| Decoding Transformed Data Field | +0 | 1 | 2 | 3 | 4 | 5 | 6 | 7 |
| Data Field | 7 | 5 | 6 | 3 | 4 | 0 | 1 | 2 |

Table III is an example and proferred not necessarily to suggest that the transformation number therein utilized (i.e., −01234567) is the optimum such number. However, it is clear that adaptive assignment of the transformed data stream will accord the number "3" the shortest time interval and accord the number "7" the longest interval. Other numbers will be assigned accordingly. It is thus apparent that data transformation is another tool to generally improve the efficacy of the present invention.

When adaptive assignment, data stream division, and data transformation are utilized to optimize the encoding of a data symbol stream, the result is greatly improved efficiency of magnetic media utilization, and while the computation to maximize the efficiency of data storage by the present invention takes some computational facility (e.g., dedicated computational hardware or a microprocessor) and requires some time to perform, the benefit is a multiple-fold increase in media storage capacity. In fact, by use of adaptive assignment, data stream division, and data transformation, it is estimated that the efficiency of data storage with respect to MFM will exceed the average efficiency as shown in FIG. 2 and approach an average best case defined as:

$$\text{Average best case efficiency} = \frac{\sum_{n=0}^{2^{B-1}-1} \frac{B}{1+nP}}{2^B}$$

where
B = number of bits in a group
P = ratio of ΔT to T
N = running variable of the summation The average best case efficiency compared to MFM encoding merely assumes that by the above adaptive assignment, data stream division, and data transformation techniques the symbols in a given data stream may be assigned, divided, and/or transformed so that only the first shorter half of the time intervals are required for storing the data stream. That is, for a three bit encoding scheme of the present invention, only the first four shortest intervals would be required. A graphic representation of the average best case efficiency for two, three, four, and five bit encoding according to the present invention is shown in FIG. 3. As shown therein, if $\Delta T$ is 10% of T, then the average best case efficiency approaches 3.1 for five bit encoding compared to MFM. That is, under these assumptions, a factor of 3.1 times more data may be stored using the present invention then MFM encoding in the same area of magnetic recording media.

In the preferred embodiment of the present invention a sector format is adopted which is repeated for every sector. Table IV sets forth a suitable sector format for the present invention.

TABLE IV

SECTOR FORMAT

| | | |
|---|---|---|
| | Gap 1 | Note 1 |
| | Preamble | Note 1 |
| | Adaptive signals 1 | Note 2 |
| | ID address mark | Note 1 |
| | ID field | Note 3 |
| Repeated | CRC | Note 4 |
| for every | Gap 2 | Note 1 |
| sector | Write splice 1 | Note 1 |
| | Adaptive signals 2 | Note 2 |
| | Coding table | Note 5 |
| | DATA address mark | Note 1 |
| | Data field | Note 6 |
| | CRC | Note 7 |
| | Write splice 2 | Note 1 |
| | Gap 3 | Note 1 |

Note 1: Unique combination of time intervals
Note 2: All configurations of data representation to adapt to speed and frequency variations
Note 3: Drive, side, cylinder, head, sector ID and sector length
Note 4: 2 bytes of CRC's covering "Adaptive signals 1" through "ID field"
Note 5: "Coding Table" specifies the one-to-one correspondence between the pulse interval representation to the binary number representation
Note 6: Data field with its length specified in the ID field
Note 7: 2 bytes of CRC's covering from "Adaptive signals 2" through "Data field"

Through the proper implementation of the gaps, preambles, adaptive signals, etc., within the sector containing a data field, key information is encoded which is needed to properly decode an encoded data stream stored in the data field of that sector. If an encoded data stream is stored in the data field, then the complete coding table, adaptive signals, etc., must be contained within the overall sector preamble preceding the data field so the data thereafter recorded in the data field may be subsequently decoded.

Within the sector format set forth in Table IV, the adaptive signals "1" and "2" comprise actual timing intervals of known duration. This information can be used by a processing unit to compensate for speed variations of the media. That is, if the media is rotating slower on read-back than when written, the time intervals of the adaptive signals "1" and "2" will measure longer than when recorded. Knowing that fact, a processing unit can scale the measured intervals within the data field so that data errors are eliminated. In addition to the adaptive signals "1" and "2", the coding table (Table IV, Note 5) stores the information needed to decode the time intervals of the encoded data stream stored in the data field of the sector including assignments, data stream division information, and data transformations.

The method for encoding and decoding digital information utilizing time intervals between pulses as described above and applied to, say, rotating magnetic direct access storage devices has other wide applicability. The basic method has application to the field of telecommunication. The telecommunications environment can be thought of as divided into two categories: asynchronous communications and synchronous communications. Synchronous communications generally follow specific protocols and are used for high speed data link transfers. Typical protocols are defined by the well-known BISYNC and SDLC standards. Asynchronous communications, on the other hand, are low speed data communications most commonly applied to digital communication over a common telephone line. Telephone line communications are severely restricted in terms of the allowable bandwidths; communications over an unconditioned telephone line must be limited to frequencies in the range of 300 to 2400 hertz. In fact, in order to allow a margin of safety for high speed communications, the upper frequency limit for telephone communications is somewhat less than 2400 hertz. As is readily apparent, this rather low upper bandwidth limitation for telephone line communications severly constricts the effective data rate that may be utilized and explains why telephone communications are rather slow.

The principles discussed above in describing the method of the present invention may be equally well applied, for example, to asynchronous communications as might be conducted over a telephone line. The object is to apply the method of the present invention to increase the effective data transfer rate beyond the upper bandwidth limitation imposed by the unconditioned telephone lines themselves. In a manner very analogous to encoding digital information upon magnetic media, this object is achieved by a series of tone assigned in the telecommunications application of the present invention to correspond to a particular symbol group of bits. For example, considering the case of a 3-bit group, eight frequencies are chosen (F0, F1, ..., F7) to represent the eight patterns forming all of the permutations of 3-bits (000, 001, ..., 111). While in magnetic recording, practical application of the present invention urges assignment of symbols, binary numbers to time intervals between pulse pairs where those time intervals are as small as possible and the time differences between pulse pairs encoding different symbols are as small as can be practicably resolved. In the case of telecommunications the frequencies are assigned to individual symbols, binary numbers, to be as high as possible and the frequency difference between individual symbols to be as small as can be practicably resolved.

Referring to FIG. 4, a series of tones waveforms, shown as sinusoids are taken arbitrarily from a pattern of encoded symbols, binary numbers according to the present invention for 3-bit encoding. By detecting positive-going zero-crossings of the sinusoits, it can be seen that a frequency F1 which corresponds to a time interval T1 between positive-going zero-crossings can be understood as having the representation "001". Likewise, a frequency F2 corresponding to a time interval T2 between positive-going zero-crossings can be understood as having the binary representation "110". In addition, the time interval between positive-going zero-crossings of T3 (corresponding to a frequency of F3) can be understood as having a binary representation of "000". In this manner, the interval of time between adjacent positive-going crossings is assigned to bit groups; an example of such an assignment table is set forth in Table V.

TABLE V

FREQUENCY ASSIGNMENTS
3-Bit Group, ΔT = 100 Microseconds

| 3-Bit Group | Time (between positive-going zero crossings with ΔT = 100 microseconds) | Frequency |
|---|---|---|
| 010 | 450 microseconds | 2200 Hz |
| 110 | 550 | 1820 |
| 100 | 650 | 1540 |
| 011 | 750 | 1330 |
| 001 | 850 | 1180 |
| 101 | 950 | 1050 |
| 111 | 1050 | 950 |
| 000 | 1150 | 870 |

Table V illustrates an assignment of time intervals between positive-going zero-crossings where the smallest time interval between adjacent positive-going zero crossings is not less than 450 microseconds, and each 3-bit group is incrementally separated by 100 microseconds from other time intervals. Therefore, the longest time interval between adjacent positive-going zero crossings is 1150 microseconds. These time intervals between adjacent positive-going zero crossings can easily be calculated to correspond to frequencies as shown in Table V. Clearly, optimization of the present invention urges the minimum time interval between adjacent positive-going zero crossings to be as small as possible and the increments separating adjacent bit groups to be as small as resolvable. Notice, in addition, that the techniques of adaptive assignment based upon the frequency of symbols, binary numbers, within the data stream, division of the data stream, and transformation of the data stream may all be accomplished upon a data stream in order to minimize the time required to asynchronously transmit a data stream. It is naturally required that the preamble to any such encoded data stream include at least one instance of a coding table in which the decoding information for the related encoded data stream is included.

If the minimum time between adjacent positive-going zero-crossing of the sinusoids is held at 450 microseconds or approximately 2200 hertz but ΔT as set at 100 microseconds in Table V is allowed to instead vary, the efficiency of application of the present invention will vary in a manner not unlike that shown for magnetic recording in FIGS. 2 and 3.

Referring to FIG. 5, the data transfer rate or DTR for 2-bit and 3-bit encoding according to the present invention as applied to asynchronous telecommunications over an unconditioned telephone line is shown as a function of ΔT. Best average efficiency and average efficiency for both 2-bit and 3-bit encoding are plotted using analogous equations as set forth above for the magnetic recording application of the present invention. In addition, the righthand vertical axis of FIG. 5 is utilized to show the lowest frequency (that is, the least efficient transmitted bit group) that will be transmitted according to the present invention utilizing 2-bit and 3-bit encoding. Clearly, the more asymmetry that exists in symbols of the data stream or clustering of symbols in particular data streams, the more effective the present invention will be in improving the data transfer rate over conventional techniques. However, it is apparent from FIG. 5 that utilizing either 2-bit or 3-bit encoding in the present invention permits an increase in the effective transfer rate of some 300 percent or more in comparison with conventional methods (e.g., the Western Electric 1200 baud 202 modem).

By detecting and measuring the time interval between positive-going zero-crossing of the sinusoid a certain redundancy is built into the method described above allowing for enhanced data reliability. That is, the time interval between positive-going zero-crossings of the sinusoid includes inherently two intervals of equal duration: the time between the positive-going zero-crossings and the negative-going zero-crossing and the time between the negative-going zero-crossing and the next positive-going crossing. As is well known in the art, data redundancy improves reliability of transmission but degrades absolute efficiency. It is clear that use of error detection and correction algorithms as well as data redundancy schemes are possible if the basic method of the present invention is utilized with a means for computation so as to maximize the efficiency of data transmission under all conditions. Further, the means for computation which performs data analysis, error detection, and error correction can also compensate for errors in the time interval between pulse pairs in a manner exactly analogous to the disk media embodiment discussed above. If the coding table is made to contain not only a translation of time interval into symbols but also contains actual pulse pair sequences (or sinusoids), then the coding table can also be a timing standard by which permits the receiver to "self clock" or self define time intervals from the received data transmission. This technique was utilized in the disk embodiment above to eliminate velocity variations between writing and read back.

FIG. 6 illustrates a suggested apparatus for practicing the telecommunications application of the method of the present invention. FIG. 6 illustrates the modem according to the present invention shown by the general reference numeral 10. Modem 10 has a transmitter 12 and a receiver 14 therewithin which make connection on the one hand to a transmission medium 16 which, in the case of the preferred embodiment, is an unconditioned telephone line. One-way communication is established into transmitter 12 along a line 18 from a storage unit 20. Similarly, one-way communication from receiver 14 into storage unit 20 is established along a line 22. Storage unit 20 is a memory constructed from commonly available devices such as static or dynamic RAM's or other devices.

Making bi-directional connection along a line 24 with storage unit 20 is a coding/encoding algorithm processor 26. Further, making bi-directional connection with storage unit 20 along a line 28 is an interface processor 30. It is interface processor 30 which provides bi-directional connection to a data terminal or computer along a line 32.

Transmitter 12 is constructed in part from a digital waveform generator 34 adapted to convert binary numbers into square wave pulses of specific timed separation. Digital waveform generator 34 connects along a line 36 to a bandpass filter 38 adapted to convert the square wave pulses from digital waveform generator 34 into smooth, sinusoids. Bandpass filter 38 connects to transmission medium 16 along a unidirectional line 40.

Receiver 14 is constructed in part from a bandpass filter 42 which connects by a unidirectional line 44 to transmission medium 16. Bandpass filter 42 is not unlike bandpass filter 38 adapted to remove the high frequency components of signals received over transmission medium 16. Connected to bandpass filter 42 along a unidirectional line 46 is a limiter 48 adapted to limit or "chop" the sinusoids from bandpass filter 42 and convert said sinusoids into square wave pulses. Thereafter, the square wave pulses produced by limiter 48 are conducted along a unidirectional line 50 to a time interval digitizer 52 adapted to convert the square wave pulses from limiter 48 into binary numbers which are received over line 22 by storage unit 20.

In operation, modem 10 functions in either a transmitting or a receiving mode. In transmitting, the data terminal or computer sends information to be transmitted along line 32. Line 32 may be an RS-232-C interface or other capable of being attached to the data terminal. Interface processor 30 connects to line 32 and provides the bi-directional interface protocols, handshakes, acknowledgements, etc. Interface processor 30 conveys the data stream to storage unit 20 over line 28. Within storage unit 20, the data must be analyzed to determine the most efficient coding so as to minimize the ultimate duration required to transmit the data stream. Coding-/encoding algorithm processor 26 could be a microprocessor or a hardwired device, but its task is to alter the data stream in order to maximize the data transfer rate in accordance with the present invention.

Symbols in the form of binary numbers exit along line 18 and enter digital waveform generator 34 which converts the data stream of binary numbers including the coding table into a stream of square wave pulses. Thereafter, the square wave pulses travel along line 36 to bandpass filter 38 which smooths the square waves into sinusoids for ultimate transmission along transmission medium 16. The information conveyed over transmission medium 16 therefore has a form not unlike that shown in FIG. 4.

In receiving mode, the data stream according to the method of the present invention is received from transmission medium 16 and conveyed along line 44 to bandpass filter 42. High frequency noise is therein eliminated and the smoothed sinusoids are sent along line 46 to limiter 48. Limiter 48 limits or "chops" the sinusoids to produce square waves where the duration between pulses is related to specific encoded symbols. Time interval digitizer 52 receives the square wave pulses along line 50 and converts the square waves into binary numbers, symbols, which relate to the measured time intervals between the square wave pulses.

Utilizing the measured time intervals between square waves in conjunction with the coding table transmitted together with the encoded data stream, coding/encoding algorithm processor 26 decodes the binary information within storage unit 20 to reconstruct the original data stream. The decoded data stream is thereafter conveyed by line 28 to interface processor 30 which provides the interface requirements to send the received data stream to the receiving data terminal or computer.

It should be noted that modem 10 may operate with other modems of the prior art by including within coding/encoding algorithm processor 26 programming and/or hardware to decode information sent for example, under the standard Western Electric 202 protocol. While the standard 202 modem does not function like modem 10, the interval between pulses may nonetheless be used to receive as well as transmit such information. Moreover, it should be noted that the concept of modem 10 which utilizes the method of the present invention may be applied to any data transmission where the encoding/decoding is bit serial in nature.

While for the sake of clarity, and in order to disclose the invention so that the same can be readily understood, a specific embodiment has been described and illustrated, it is to be understood that the present invention is not limited to the specific means disclosed. It may be embodied in other ways that will suggest themselves to persons skilled in the art. It is believed that this invention is new and that all such changes that come within the scope of the following claims are to be considered as part of this invention.

What is claimed is:

1. A method for decoding digital information encoded into a first plurality of time intervals respectively between a plurality of successive pairs of digital pulses into a plurality of successive symbols equal in number to said first plurality of time intervals, said encoded data stream having a total time interval equal to the sum of said first plurality of time intervals plus said duration of all of said digital pulses, said plurality of symbols upon decoding making up a data stream, all of said symbols in said data stream being members of a non-empty set of "n" symbols, said second plurality of successive pairs of digital pulses being received by transmission, the method for decoding said encoded digital information comprising the steps of:
    (a) providing a coding table coupled to said encoded data stream, said coding table storing a range of time intervals, each respective range of time intervals being related to a symbol in said set of "n" symbols, each range of time intervals further having adaptive assignment with said symbol occurring most frequently in said data stream assigned a range of time intervals in said coding table shorter than said range of time intervals assigned to said symbols occurring less frequently in said data stream, and with successively longer ranges of time intervals assigned to said symbol in said data stream having the next lower frequency of occurrence whereby said correspondence between each range of time intervals stored in said coding table to symbols in said set of "n" symbols minimizes the total time interval of said encoded data stream;
    (b) receiving a first digital pulse for indicating the beginning of an encoded data stream;
    (c) receiving a digital pulse successive to said preceeding digital pulse;
    (d) measuring the time interval between said successive digital pulse and the digital pulse immediately preceeding said successive digital pulse;
    (e) comparing said measured time interval with said range of time intervals stored in the coding table whereby each successive symbol is decoded from each successive time interval; and
    (f) successively repeating steps (c), (d) and (e) for all the remaining time intervals in said encoded data stream whereby said encoded data stream is decoded.

2. The method of claim 1 wherein said range of time intervals in said coding table relate to symbols in said set of "n" symbols which are binary numbers having "m" digits where "m" is a non-negative integer whereby said coding table contains no more than $2^m$ range of time intervals relating to the "n=$2^m$" symbols which may be represented by binary numbers having "m" digits.

3. The method of claim 1 wherein successive ranges of time intervals in said coding table are separated by equal durations.

4. The method of claim 1 wherein further said encoded data stream has been divided into a plurality of substreams of said data stream, said substreams being respectively increased in asymmetry with respect to the frequency of occurrence of symbols within each of said substreams of said data stream whereby adaptive assignment of each substream of said data stream further decreases the total time interval of each encoded substream of said data stream, said coding table coupled to each encoded data stream further containing information relating to the division of said data stream into substreams wherein the method further comprises the steps of:

separately decoding said time intervals of each substream of said encoded data stream as though each encoded substream of said data stream were a separate set of time intervals encoding a separate data stream; and combining said separately decoded substreams of said data stream whereby said encoded data stream is completely decoded.

5. The method of claim 1 wherein further said encoded data stream has been transformed by adding a number to a numerical representation of said data stream thereby obtaining a transformed data stream so that the frequency of occurrence of symbols within said transformed data stream is thereby increased in asymmetry whereby adaptive assignment of said transformed data stream further decreases the total time interval of said transformed, encoded data stream, said coding table coupled to said encoded data stream further containing information relating to the transformation of said data stream wherein the method further comprises the step of:

substracting said number from a numerical representation of said data stream obtained by decoding said time intervals of said encoded data stream whereby said encoded data stream is completely decoded.

6. A method for encoding digital information for transmission thereof, said digital information including a first plurality of successive symbols making up a data stream with all of said symbols being members of a non-empty set of "n" symbols, comprising the steps of:

(a) providing a coding table coupled to said data stream, said coding table storing time intervals with each respective time interval being related to a symbol in said set of "n" symbols and each time interval having adaptive assignment with said symbol occurring most frequently in said data stream assigned a time interval shorter than said time interval assigned to said symbols occurring less frequently in said data stream, and with successively longer time intervals assigned to said symbol in said data stream having said next lower frequency of occurrence;

(b) generating a first digital pulse for indicating the beginning of an encoded data stream;

(c) determining a time interval for each successive symbol in said plurality of symbols making up said data stream by means of said coding table;

(d) generating a successive digital pulse subsequent to the generation of said immediately preceding digital pulse after a time interval equal to said time interval determined for said symbol by means of said coding table whereby each successive symbol in said data stream is encoded for transmission into a time interval between successive digital pulses; and (e) successively repeating steps (c) and (d) for all the remaining symbols in said data stream whereby said entire data stream is encoded into a plurality of time intervals equal in number to said plurality of symbols in said data stream, said time intervals being respectively separated by digital pulses, whereby because of said adaptive assignment said total time interval of said encoded data stream which equals the sum of all said time intervals between successive digital pulses plus said duration of all of said digital pulses is minimized.

7. The method of claim 6 wherein said time intervals in said coding table relate to symbols in said set of "n" symbols which are binary numbers having "m" digits where "m" is a non-negative integer, whereby said coding table contains no more than $2^m$ time intervals relating to the "n=$2^m$" symbols.

8. The method of claim 6 wherein successive time intervals in said coding table are separated by equal durations.

9. The method of claim 6 wherein prior to generating said first digital pulse, the method further comprises the steps of:

dividing said data stream into a plurality of substreams, said substreams being respectively increased in asymmetry with respect to the frequency of occurrence of symbols within each of said substreams whereby adaptive assignment of each substream further decreases the total time interval of each encoded substream, said coding table coupled to each encoded data stream further containing information relating to the division of said data stream into substreams; and separately encoding said symbols of each substream into time intervals between successive pairs of digital pulses as though each substream were a separate data stream whereby said total time interval of said divided, encoded data stream is decreased.

10. The method of claim 6 wherein prior to generating said first digital pulse, the method further comprises the step of:

transforming said data stream by adding a number to a numerical representation of said data stream thereby obtaining a transformed data stream so that the frequency of occurrence of symbols within said transformed data stream is thereby increased in asymmetry whereby adaptive assignment of said transformed data stream further decreases the total time interval of said transformed, encoded data stream, said coding table coupled to said encoded data stream further containing information relating to the transformation of said data stream.

11. The method of claim 1 wherein prior to the receipt of said first digital pulse, the method further comprises the steps of:

reproducing said encoded data stream including said first plurality of time intervals between said second plurality of successive pairs of digital pulses from a recording media wherein said encoded data stream is stored, said encoded data stream being reproduced by means of a storage device, said storage device being adapted for reproducing said encoded data stream including said first plurality of time intervals and said second plurality of successive pair of digital pulses from a prior recording thereof in said recording media; and transmitting said reproduced, encoded data stream including said first plurality of time intervals between said second plurality of successive pairs of digital pulses for reception and decoding thereof.

12. The method of claim 6 further comprising the steps of:

transmitting said encoded data stream including said first plurality of time intervals between said second plurality of successive pairs of digital pulses to a storage device wherein said encoded data stream may be stored on a recording media, said storage device being adapted for recording said encoded data stream including said first plurality of time intervals and said second plurality of successive pairs of digital pulses on said recording media so said intervals and said pulses may be subsequently reproduced therefrom, and recording said encoded data stream including said first plurality of time intervals between said second plurality of successive pairs of digital pulses in said recording media.

13. The method of claims 11 or 12 wherein said digital pulses of said encoded data stream are stored in said recording media as magnetic flux reversals.

14. The method of claims 11 or 12 wherein said coding table coupled to said encoded data stream is stored therewith in said recording media.

15. The method of claims 11 or 12 wherein said stored, encoded data stream further has stored therewith adaptive signals which when reproduced along with said stored, encoded data stream and coding table permit compensation for variations in speed of said recording media between recording therein and reproducing therefrom.

16. A method for decoding digital information encoded into a succession of tones for telecommunications thereof, said digital information including a plurality of successive symbols making up a data stream, all of said symbols in said data stream being members of a non-empty set of "n" symbols, the method for decoding said succession of tones as applied repetitively to decode successive symbols comprising the steps of:

(a) providing a coding table coupled to said encoded data stream, said coding table storing a range of time intervals, each respective range of time intervals being related to a symbol of said set of "n" symbols, each range of time intervals further having adaptive assignment with said symbol occurring most frequently in said data stream assigned a range of time intervals in said coding table shorter than said range of time intervals assigned to said symbols occurring less frequently in said data stream, and with successively longer ranges of time intervals assigned to said symbol in said data stream having said next lower frequency of occurrence whereby said correspondence between each range of time intervals stored in said coding table to symbols in said set of "n" symbols minimizes the total time interval of said encoded data stream;

(b) measuring a time interval between successive zero-crossings of a sinusoid of said tone; and (c) comparing said measured time interval to a range of time intervals stored in the coding table whereby each successive symbol is decoded from each successive time interval; and (d) successively repeating steps (b) and (c) for all the remaining time intervals in said encoded data stream whereby said encoded data stream is decoded.

17. The method of claim 16 wherein said range of time intervals in said coding table relate to symbols in said set of "n" symbols which are binary numbers having "m" digits where "m" is a non-negative ineger whereby said coding table contains no more than $2^m$ range of time intervals relating to the "$n=2^m$" symbols which may be represented by binary numbers having "m" digits.

18. The method of claim 16 wherein the successive ranges of time intervals in said coding table are separated by equal incremental durations.

19. The method of claim 16 wherein further said encoded data stream has been divided into a plurality of substreams of said data stream, said substreams being respectively increased in asymmetry with respect to the frequency of occurrence of symbols within each of said substreams of said data stream whereby adaptive assignment of each substream of said data stream further decreases the total time interval of each encoded substream of said data stream, said coding table coupled to each encoded data stream further containing information relating to the division of said data stream into substreams wherein the method further comprises the steps of:

separately decoding said succession of tones of each substream of said encoded data stream as though each encoded substream of said data stream were a separate set of tones encoding a separate data stream; and combining said separately decoded substreams of said data stream whereby said encoded data stream is completely decoded.

20. The method of claim 16 wherein further said encoded data stream has been transformed by adding a number to a numerical representation of said data stream thereby obtaining a transformed data stream so that the frequency of occurrence of symbols within said transformed data stream is thereby increased in asymmetry whereby adaptive assignment of said transformed data stream further decreases the total time interval of said transformed, encoded data stream, said coding table coupled to said encoded data stream further containing information relating to the transformation of said data stream wherein the method further comprises the step of:

subtracting said number from a numerical representation of said data stream obtained by decoding said succession of tones of said encoded data stream whereby said encoded data stream is completely decoded.

21. A method for encoding digital information for telecommunications thereof, said digital information consisting of a first plurality of successive symbols making up a data stream, all of said symbols in said data stream being members of a non-empty set of "n" symbols, the method for encoding said symbols making up said data stream as applied repetitively to encode successive symbols comprising the steps of:

(a) providing a coding table coupled to said encoded data stream, said coding table storing time intervals, each respective range of time interval being related to a symbol in said set of "n" symbols, each range of time intervals further having adaptive assignment with said symbol occurring most frequently in said data stream assigned to said symbols occurring less frequently in said data stream, and with successively ranges of time intervals assigned to said symbol in said data stream having said next lower frequency of occurrence;

(b) determining a tone for each successive symbol in said plurality of symbols making up said data stream by means of said coding table;

(c) generating a sinusoid of said tone determined by means of said coding table so that a time interval between successive zero-crossings of said sinusoid so generated equals said time interval determined for said symbol by means of said coding table whereby each successive symbol in said data stream is successively encoded into a tone for transmission and whereby, further, said entire data stream is encoded into a plurality of successive tones equal in number to said plurality of symbols in said data stream;

(d) successively repeating steps (b) and (c) for all remaining time intervals whereby said encoded data stream is encoded.

22. The method of claim 21 wherein said time intervals in said coding table relate to symbols in said set of "n" symbols which are binary numbers having "m" digits where "m" is a non-negative integer whereby said coding table contains no more than $2^m$ time intervals relating to the "$n=2^m$" symbols which may be represented by binary numbers having "m" digits.

23. The method of claim 21 wherein successive time intervals in said coding table are separated by equal incremental durations.

24. The method of claim 21 wherein prior to determining a tone for any symbol of said data stream, the method further comprises the steps of:

dividing said data stream into a plurality of substreams of said data stream, said substreams being respectively increased in asymmetry with respect to the frequency of occurrence of symbols within each of said substreams of said data stream whereby adaptive assignment of each substream of said data stream further decreases the total time interval of each encoded substream of said data stream, said coding table coupled to each encoded data stream further containing information relating to the division of said data stream into substreams; and separately encoding said symbols of each substream of said data stream into a plurality of successive tones as though each substream of said data stream were a separate data stream whereby said total time interval of said divided, encoded data stream is decreased.

25. The method of claim 21 wherein prior to determining a tone for any symbol of said data stream, the method further comprises the step of:

transforming said data stream by adding a number to a numerical representation of said data stream thereby obtaining a transformed data stream so that the frequency of occurrence of symbols within said transformed data stream is thereby increased in asymmetry whereby adaptive assignment of said transformed data stream further decreases the total time interval of said transformed, encoded data stream, said coding table coupled to said encoded data stream further containing information relating to the transformation of said data stream.

26. The method of claims 16 or 21 wherein said coding table is communicated by means of telecommunications along with said encoded data stream.

27. The method of claims 16 or 21 wherein said telecommunicated encoded data stream further includes adaptive signals which when telecommunicated along with said encoded data stream permits a receiver thereof to self-clock from the received telecommunications.

28. A method for encoding digital information for transmission thereof, said digital information including a first plurality of successive symbols making up a data stream, with all of said symbols being members of a non-empty set of "n" symbols, comprising the steps of:

(a) providing a coding table coupled to said data stream, said coding table storing time intervals with each respective time interval being related to a symbol in said set of "n" symbols and each time interval stored in said coding table being unique and resolvable from all other time intervals stored therein;

(b) generating a first digital pulse for indicating the beginning of an encoded data stream;

(c) determining a time interval for each successive symbol in said plurality of symbols making up said data stream by means of said coding table;

(d) generating a successive digital pulse subsequent to the generation of said immediately preceding digital pulse after a time interval equal to said time interval determined for said symbol by means of said coding table whereby each successive symbol in said data stream is encoded for transmission into a time interval between successive digital pulses; and (e) successively repeating steps (c) and (d) for all the remaining symbols in said data stream whereby said entire data stream is encoded into a plurality of time intervals equal in number to said plurality of symbols in said data stream, said time intervals being respectively separated by digital pulses, whereby, further, said total time interval of said encoded data stream which equals the sum of all of said time intervals between successive digital pulses plus said duration of all of said digital pulses depends both upon the particular occurrence of symbols in said data stream and upon said time intervals respectively assigned by said coding table to said individual symbols in said set of "n" symbols.

29. A method for decoding digital information encoded into a first plurality of time intervals respectively between a plurality of successive pairs of digital pulses into a plurality of successive symbols equal in number to said first plurality of time intervals, said encoded data stream having a total time interval equal to the sum of said first plurality of time intervals plus said duration of all of said digital pulses, said plurality of symbols upon decoding making up a data stream, all of said symbols in said data stream being members of a non-empty set of "n" symbols, said plurality of successive pairs of digital pulses being received by transmission, the method for decoding said encoded digital information comprising the steps of:

(a) providing a coding table coupled to said encoded data stream, said coding table storing a range of time intervals, each respective range of time intervals being related to a symbol in said set "n" symbols, each range of time intervals stored in said coding table being unique and resolvable from all other ranges of time intervals stored therein whereby said total time interval of said encoded data stream depends both upon the particular occurrence of symbols in said data stream and upon ranges of said time intervals respectively assigned by said coding table to said individual symbols in said set of "n" symbols;

(b) receiving a first digital pulse for indicating the beginning of an encoded data stream;

(c) receiving a digital pulse successive to said preceding digital pulse;

(d) measuring the time interval between said successive digital pulse and the digital pulse immediately preceding said successive digital pulse;

(e) comparing said measured time interval with said range of said time intervals stored in the coding table whereby each successive symbol is decoded from each successive time interval; and (f) successively repeating steps (c), (d) and (e) for all the remaining time intervals in said encoded data stream whereby said encoded data stream is encoded.

30. A method for encoding digital information for telecommunications thereof, said digital information including a plurality of successive symbols making up a data stream, all of said symbols in said data stream being members of a non-empty set of "n" symbols, the method for encoding said symbols making up said data stream as applied repetitively to encode successive symbols comprising the steps of:

(a) providing a coding table coupled to said data stream, said coding table storing time intervals with each respective time interval being related to a symbol in said set of "n" symbols and each time interval stored in said coding table being unique and resolvable from all other time intervals stored in said coding table;

(b) determining a time interval for each successive symbol in said plurality of symbols making up said data stream by means of said coding table;

(c) generating a sinusoid having a time interval between successive zero-crossings which equals said time interval determined for said symbol by means of said coding table whereby each successive symbol in said data stream is successively encoded into a tone for transmission; and (d) successively repeating steps (b) and (c) for all the remaining symbols in said data stream whereby said entire data stream is encoded into a plurality of successive tones equal in number to said plurality of symbols in said data stream.

31. A method for decoding digital information encoded into a succession of tones for telecommunications thereof, said digital information including a plurality of successive symbols making up a data stream, all of said symbols in said data stream being members of a non-empty set of "n" symbols, the method for decoding said succession of tones as applied repetitively to decode successive symbols comprising the steps of:

(a) providing a coding table coupled to said encoded data stream, said coding table storing a range of time intervals, each respective range of time intervals being related to a symbol in said set of "n" symbols, each range of time intervals stored in said coding table being unique and resolvable from all other ranges of time intervals stored therein whereby said total time interval of said encoded data stream depends both upon the particular occurrence of symbols in said data stream and upon said time intervals respectively assigned by said coding table to said individual symbols in said set of "n" symbols;

(b) measuring a time interval between successive zero-crossing of a sinusoid of said tone;

(c) comparing said measured time interval to said ranges of time intervals stored in the coding table whereby each successive symbol is decoded from each successive tone; and (d) successively repeating steps (b) and (c) for all the remaining tones in said encoded data stream whereby said encoded data stream is decoded.

* * * * *